United States Patent
Paden et al.

(10) Patent No.: US 12,404,834 B2
(45) Date of Patent: *Sep. 2, 2025

(54) CONFIGURABLE MULTI-PURPOSE CROSS-FLOW WIND TURBINE WITH PERFORMANCE ENHANCEMENTS

(71) Applicant: Velocity Wind Turbines LLC, Austin, TX (US)

(72) Inventors: Jon Paden, Austin, TX (US); Paul Severin, Austin, TX (US)

(73) Assignee: VELOCITY WIND TURBINES LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,392

(22) Filed: Jan. 24, 2024

(65) Prior Publication Data

US 2024/0200529 A1    Jun. 20, 2024

Related U.S. Application Data

(63) Continuation of application No. 17/397,538, filed on Aug. 9, 2021, now Pat. No. 11,885,295.

(51) Int. Cl.
*F03D 1/06* (2006.01)
*F03D 9/25* (2016.01)

(52) U.S. Cl.
CPC ............ *F03D 1/0675* (2013.01); *F03D 9/25* (2016.05); *F05B 2240/21* (2013.01)

(58) Field of Classification Search
CPC ..... F03D 1/0675; F03D 3/061; F05B 2240/21
USPC ........................................ 290/42, 44, 53, 55
See application file for complete search history.

(56) References Cited

U.S. PATENT DOCUMENTS

| | | | | |
|---|---|---|---|---|
| 2,153,523 | A * | 4/1939 | Edmonds | H02K 7/183 416/DIG. 4 |
| 6,740,989 | B2 * | 5/2004 | Rowe | F03D 80/70 415/4.4 |
| 8,264,096 | B2 * | 9/2012 | Micu | F03D 9/25 290/43 |
| 9,284,943 | B2 * | 3/2016 | Zha | F03D 3/0409 |
| 11,885,295 | B2 * | 1/2024 | Paden | F03D 9/25 |
| 2002/0109358 | A1 * | 8/2002 | Roberts | F03D 3/0409 290/54 |
| 2006/0275105 | A1 * | 12/2006 | Roberts | F03D 3/061 415/4.2 |
| 2008/0246284 | A1 * | 10/2008 | Pelman | F03D 3/005 290/55 |
| 2010/0225119 | A1 * | 9/2010 | Micu | F03D 1/025 290/55 |
| 2011/0042962 | A1 * | 2/2011 | Yoon | F03D 3/062 290/55 |
| 2012/0280510 | A1 * | 11/2012 | Hwang | F03D 3/067 416/223 R |
| 2015/0167635 | A1 * | 6/2015 | Kwak | F03D 3/02 290/55 |

(Continued)

*Primary Examiner* — Charles Reid, Jr.
(74) *Attorney, Agent, or Firm* — Glenn Gold, P.A.; Glenn E. Gold

(57) ABSTRACT

A wind turbine rotor includes an axle, a plurality of primary blades disposed at regular intervals around the axle, and a plurality of secondary blades disposed around the axle between primary blades of the plurality of primary blades. Each secondary blade of the plurality of secondary blades is smaller than each primary blade of the plurality of primary blades.

12 Claims, 14 Drawing Sheets

(56) References Cited

U.S. PATENT DOCUMENTS

2018/0180018 A1\* 6/2018 Kurita .................... F03D 3/002
2020/0132043 A1\* 4/2020 Brewer ................ F03D 1/0633

\* cited by examiner

CONFIGURABLE MULTI-PURPOSE CROSS-FLOW WIND TURBINE WITH PERFORMANCE ENHANCEMENTS

CROSS-REFERENCE TO RELATED APPLICATION(S)

This application claims benefit of U.S. Provisional Application No. 63/063,955, filed Aug. 10, 2020, which is incorporated herein by reference in its entirety.

FIELD OF THE DISCLOSURE

The present disclosure relates to the field of renewable energy, and more specifically wind turbines designed for cross-flow or transverse-axial flow applications.

BACKGROUND

Wind turbines can be readily deployed at specific locations where power generated from the wind turbines may be used directly at the site of deployment, directed into a power grid, or stored in energy storage systems. The wind turbine may also contribute to a local micro-grid, serving more than one facility. As such, wind power generation represents a desirable alternative energy source in many situations.

However, conventional wind turbines suffer from inefficiencies and low power situations. In particular, conventional drag-based wind turbines suffer from inefficiencies cause when wind impinges returning blades. Such conventional drag-based wind turbines also are known for self-starting problems.

As such, an improved wind turbine would be desirable.

BRIEF DESCRIPTION OF THE DRAWINGS

The present disclosure may be better understood, and its numerous features and advantages made apparent to those skilled in the art by referencing the accompanying drawings. It should be noted that the drawings are provided in order to assist in the understanding of the invention and are not intended to be limiting to what is specifically illustrated within each drawing. The present invention may be used in a variety of configurations utilizing the same operating principles as described herein.

The use of the same reference symbols in different drawings indicates similar or identical items.

DETAILED DESCRIPTION

In an example, a wind turbine uses primary and secondary blades that interact with each other to enhance the performance of the wind turbine during rotation. The enhanced performance is accomplished by positioning secondary blades within the primary blades to further concentrate and convert the force of the wind that flows over the convex and concave surfaces of both the primary and secondary blades into useful energy.

A drag-based, cross-flow configuration is described, wherein an example rotor design is utilized to enhance the performance (or power output) of the wind turbine. The performance increase is achieved by configuring the rotor with a plurality of primary blades (or scoops) around an axis, for example, defined by a rotating shaft, and then further positioning an additional set of secondary blades in between the primary blades wherein the position and shape (or configuration) of the secondary blades adds to both the capture of additional energy from wind directly, while also redirecting additional wind force into the primary blade set.

Herein, the terms "blades" and "scoops" may be used interchangeably during the description. Generally, the parts of a wind turbine that interact directly with the wind are referred to as blades. The blades of a typical utility scale wind turbine are of a foil or lift-based design. The blades of a drag-based wind turbine are generally more in the shape of a scoop, but may also be generally also referred to as blades. The term "rotor" refers to a complete set of blades surrounding an axis and optionally, attached to a central shaft or axle defining the axis.

The term "configuration" may be used to describe the overall shape, size, curvature, depth, and angle of an individual primary or secondary blade. The same term of configuration may also be used to describe a complete rotor, wherein the configuration of the rotor describes the complete rotor, comprising the individual sets of primary and secondary blades, each with their own configurations, surrounding or attached to a central shaft or axle.

Figure 1:
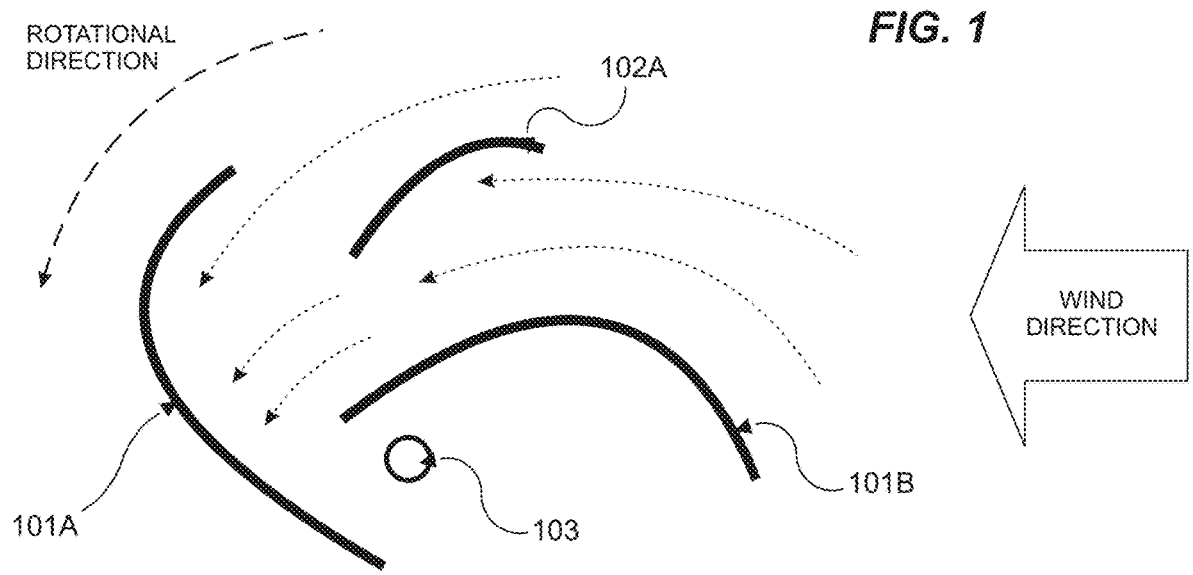
FIG. 1 is a partial cross section view illustrating an example wind turbine.

FIG. 1 represents a partial cross section of an example wind turbine. The partial cross section view is provided to illustrate an operating principle of the wind turbine. The wind turbine can be in a vertical or horizontal orientations. In FIG. 1, the partial cross section is illustrated with the wind direction coming towards it horizontally from right. Further indicators in FIG. 1 show the resulting wind paths as the wind interacts with and rotates the wind turbine. For clarity, the wind interaction is illustrated in dotted lines and the direction of rotation is illustrated in a hashed line.

In this view, and at this angle, a primary blade 101A is illustrated in a position in which the concave surface is mostly facing the wind and is receiving the force of the wind in order to rotate the axle 103. The axle rotation is counterclockwise in this view.

Another primary blade 101B is illustrated in its position relative to the axle during this point of rotation. While in this position, the primary blade 101B is illustrated acting upon the primary blade 101A by redirecting airflow that passes over the primary blade 101B into the primary blade 101A.

A secondary blade 102A adds additional wind capture surface area to the rotor and also interacts with the primary blades (101A, 101B) preceding it and following it to yield a positive effect for increased efficiency.

As the wind flows across the top of primary blade 101B, it is channeled partially into secondary blade 102A, which adds to rotational torque, and also into primary blade 101A, which further contributes to rotational torque. In this method, the bypass air that flows around each blade is utilized for a positive effect by concentrating wind energy into adjacent blades, while still allowing a portion of wind to flow through the rotor.

The secondary blade 102A further contributes though its positioning and configuration (or shape and angle relative to the axle) by enabling the acceleration of air flow based on the incoming wind to be redirected and slightly compressed between the primary and secondary blades of the rotor.

During rotation, both the primary blades and secondary blades perform alternating roles in contributing to the overall torque transmitted to the axle through direct wind force, and through redirection into other blades. This effect is referred to as "continuous cycle," as described in further detail using the accompanying FIG. 2.

Figure 2:
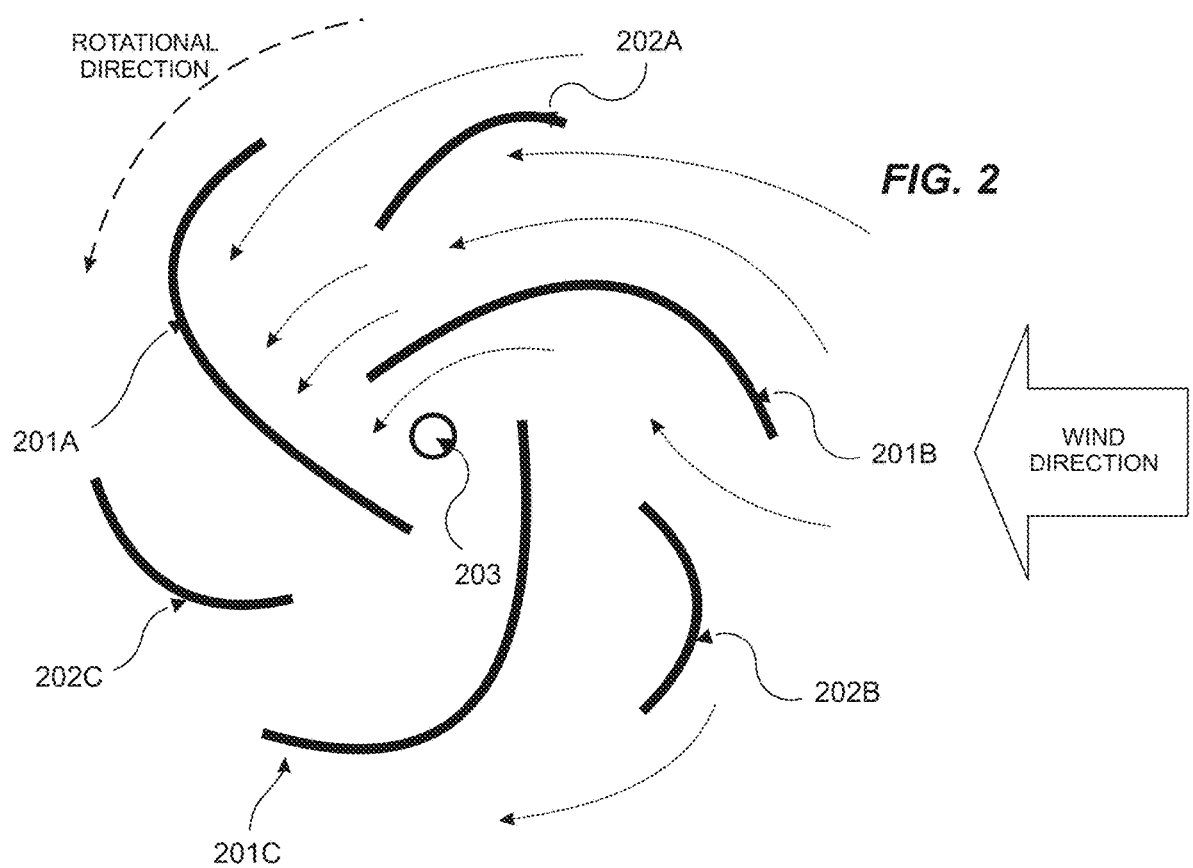
FIG. 2 is a cross section view illustrating an example configuration of a wind turbine rotor.

FIG. 2 illustrates a cross section view of an example rotor. The wind is again illustrated coming in from the right, and the rotor is illustrated with three primary blades 201A, 201B, 201C, and three secondary blades, 202A, 202B, 202C.

While in rotation, this rotor configuration forms a continuous cycle of wind interaction that provides multiple benefits. As described previously, both the primary and secondary blades serve to provide rotational torque to the axle 203, while also concentrating wind flow into the blades adjacent to or nearly adjacent to them.

The wind flow into the rotor is both captured by each individual blade (primary and secondary blades) to transmit direct torque to the axle, and also redirected into adjacent blades. This effect further increases the amount of torque that each blade within the rotor can contribute to the rotation of the axle.

Figure 4:
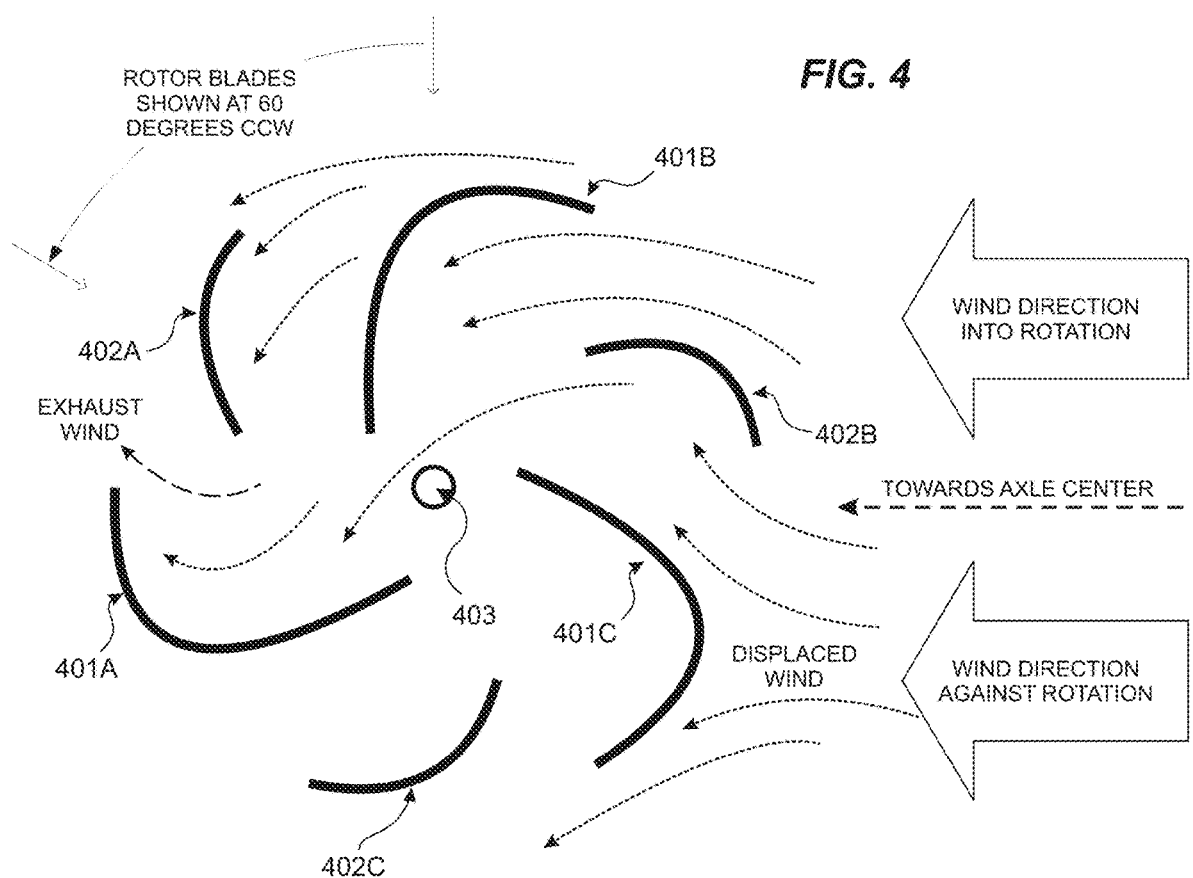
FIG. 4 is a cross section view of the example wind turbine rotor assembly.

While FIG. 2 illustrates the rotor at a specific angle relative to a specific wind direction, benefits of the described rotor are not limited to any specific rotation angle or incoming wind direction, for example, as is further illustrated in FIG. 4.

An additional benefit realized from the example rotor configurations described herein is a reduction in what is commonly referred to as "return drag" when increasing the number of blades in a cross-flow wind turbine.

Figure 3:
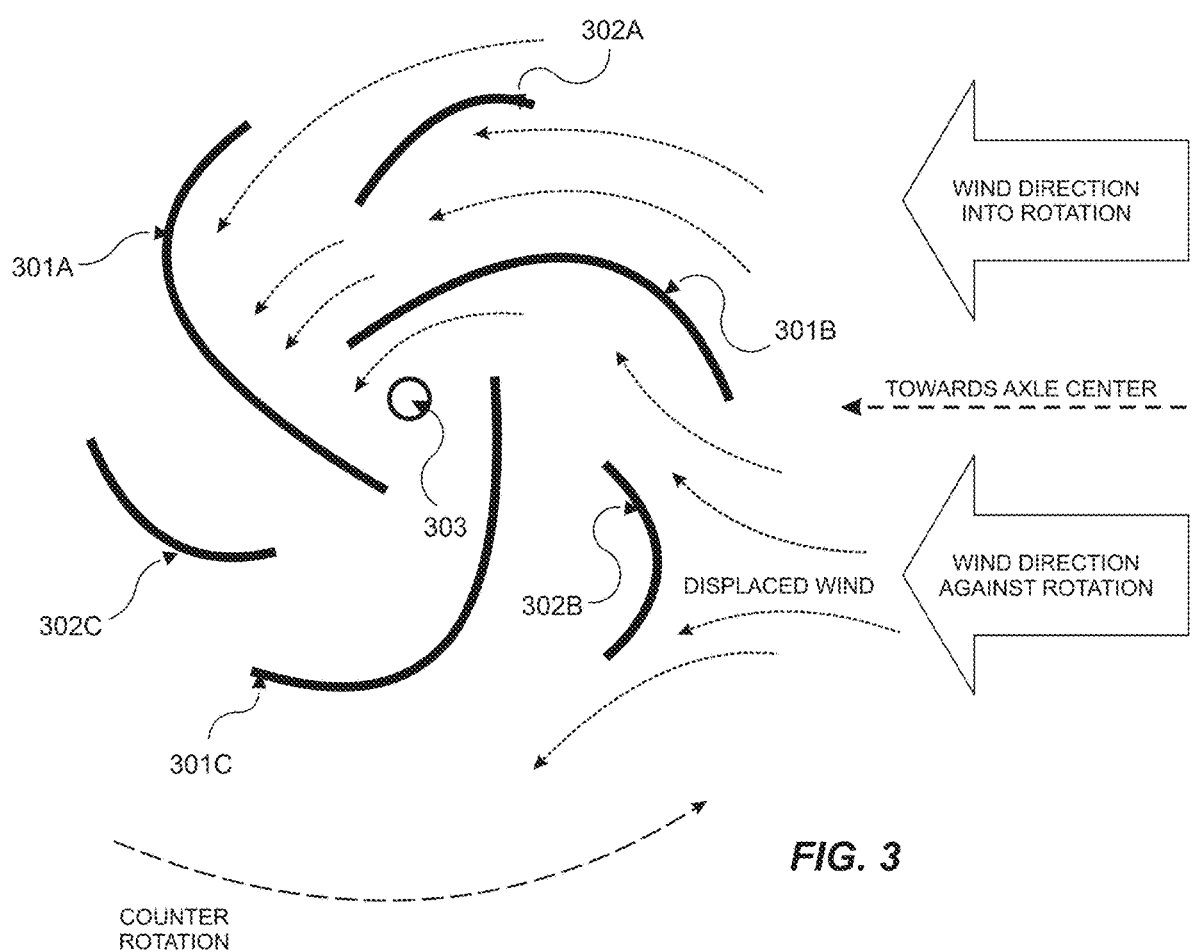
FIG. 3 is a cross section view of an example wind turbine rotor assembly.

As illustrated in FIG. 3, the example rotor configurations provide additional benefits beyond the continuous cycle of wind concentration into the blades acting upon the axle during rotation. The example rotor configurations provide a shielding effect that reduces return drag for the portion of the cross-flow wind turbine rotor that is returning back into the wind during rotation. The effect of return drag in conventional cross flow wind turbine is a well-known limiting factor in the performance characteristics of such wind turbines.

For a better understanding of the return drag reduction benefit, it may be beneficial at this point to briefly describe some problems associated with increasing the number of blades on a Savonius style wind turbine. It has been found that increasing the number of blades in a Savonius based wind turbine can lower the performance. While this may seem counterintuitive, it is easily explained. If a number of primary blades is increased, for example, from three to six, then the inner points of the blades (the points of the blades closest to the axle) would be directed more directly towards the axle to accommodate the space required for the additional blades. In this case, any intended effect of increased performance though the addition of more blades may be reduced or negated for various reasons. For example, the incoming wind may be substantially blocked on each blade by the next blade in front of it, relative to the incoming wind direction. Additionally, the return drag on the rotor may be increased disproportionately when compared to any positive effect expected from the addition of more blades of the same configuration. Furthermore, since the wind is channeled more inwardly toward the center axle point, the effective conversion of the cross flowing wind into useful rotational torque is reduced.

Embodiments of the present wind turbine and rotor provide a solution to enable the addition of more blades to a cross flow wind turbine rotor that provides a beneficial increase in performance while reducing the negative effects of return drag. By using alternating blade profile configurations around the axle, the problems discussed above can be converted into a beneficial effect. FIG. 3 illustrates a rotor configuration using six blades; 3 primary blades (301A, 301B and 301C), and 3 secondary blades (302A, 302B and 302C). The primary and secondary blade sets are configured differently in order to enhance performance.

Specifically indicated in FIG. 3 is the interaction between the turbine rotor and the incoming wind on the return side of rotation back into the wind, particularly for secondary blade 302B, primary blade 301C, and secondary blade 302C. The view of the incoming wind direction into the rotor is indicated by a hashed line pointing directly towards the center point of the axle of the rotor. Also illustrated in FIG. 3 are additional indicators, "Wind Direction Into Rotation" and "Wind Direction Against Rotation", which are illustrated in dotted lines to illustrate the wind flow into the rotor, at points above and below the center point of wind directly towards the axle.

In this view, secondary blade 302B is most directly facing and rotating into the incoming wind. The wind pattern is displaced approximately in front of secondary blade 302B relative to the incoming wind. The displaced wind pattern is illustrated in dotted line arrows above and below the text indicating "Displaced Wind". The secondary blade 302B displaces a portion of the wind to flow up into the wind turbine rotor, most directly into primary blade 301B, wherein a portion the exhaust wind from primary blade 301B acts upon primary blade 301A, further contributing to rotational torque. As is further illustrated, the secondary blade 302B displaces another portion wind outward from the center of rotation. The effect of this rotor configuration provides a shielding effect to primary blade 301C, which is following secondary blade 302B around the axis of rotation. Additionally, in this position relative to the illustrated wind angle, the secondary blade 302C which follows the primary blade 301C is completely shielded by primary blade 301C.

As the wind turbine rotor continues around its axis of rotation, each of the primary and secondary blades perform functions of transmitting torque to the axle, augmenting adjacent blades, and shielding following blades.

To further illustrate a primary functionality and benefit of the embodiments, FIG. 4 is provided, in which the rotor configuration illustrated in FIG. 3 is rotated at 60 degrees counterclockwise around a central axis, for example, an axle (303 or 403) relative to the angle illustrated in FIG. 3.

In FIG. 4, the wind is illustrated coming toward the wind turbine rotor in a direction substantially from the right as illustrated in FIG. 3. In this configuration, the 3 primary blades (401A, 401B and 401C) are shown angularly offset counterclockwise from their original position in FIG. 3, and the 3 secondary blades (402A, 402B and 402C) are likewise shown angularly offset counterclockwise from their original position in FIG. 3. In the angle of rotation of the rotor depicted in FIG. 4, the secondary blades are now moved into the position of the primary blades relative to the wind and axle (303, 403) as illustrated in FIG. 3.

As is illustrated in FIG. 4, the beneficial wind concentration effect continues to occur during this angle of rotation. When viewing at this angle, the secondary blade 402B is most directly facing into incoming wind. As the wind flows across the top of secondary blade 402B, it is concentrated into primary blade 401B. As the wind flows under secondary blade 402B, in this position, there is additional wind concentration upward and into the concave surface of secondary blade 402B, which is assisted by the displaced wind indicated from proximate primary blade 401C. In this configuration, and in this position, another portion of the wind that passes through blades 402B and blades 401C will exhaust past the rotor axle and contribute to a downward force on primary blade 401A. This is indicated in FIG. 4 by the hashed arrow line and label of "Exhaust Wind" above primary blade 401A.

Another benefit is the beneficial use of exhaust wind. The rotor configuration illustrated in FIG. 4 enables some exhaust wind to flow out of the side of the wind turbine rotor facing away from the incoming wind in such a way that the exhaust wind further contributes to a downward force which contributes to rotational torque transmitted by the rotor assembly to the axle.

The angles, curvatures, relative sizes, and positioning of the primary and secondary blades represented in FIGS. 1-4 are intended to impart an understanding of the basic operating principles and benefits of embodiments of the turbine and rotor. The angles, curvatures, shapes, relative sizes, and positioning of the primary and secondary blades may be modified for various configurations of a rotor to achieve the same benefits.

An additional benefit is evident when comparing FIG. 4 to FIG. 3. As is apparent from the alternative angle illustrated in FIG. 4, during rotation, the distribution of wind forces driving the rotation of the axle remains relatively consistent throughout each rotation due to the continuous cycle of the contribution of the primary and secondary blades to the overall and combined force transmitted to the axle during rotation. The use of primary and secondary blades on a wind turbine rotor enables a more stabilized transmission of torque to the axle over that of a typical cross flow wind turbine rotor.

For example, a two or three blade, drag-based wind turbine rotor, such as in a typical Savonius style configuration may experience uneven or intermittent pulses of torque transmitted to the axle from the rotor during operation. This uneven torque can result in vibration and noise, which can limit the potential applications of use or sites of deployment for such designs. These forces also contribute to mechanical fatigue on the rotor and related parts and may also contribute to inefficiencies when coupled to charge controllers or grid tie inverters due to the fact that the torque applied to an attached generator or alternator fluctuates as the effective surface area of such a rotor facing the wind increases and decreases during points of rotation. This is especially notable in two-blade, drag-based Savonius style wind turbine rotors.

Additionally, in a two-blade rotor configuration, self-starting problems may occur. If a two-blade cross flow rotor is positioned in a resting point relative to a future incoming wind angle that is substantially parallel to the incoming wind, a greater amount of wind may be required to force the rotor into a rotation speed to provide any useful energy or work, which further contributes to an overall loss of efficiency during operation.

As discussed above, the common approach of adding more blades of the same configuration can negatively impact performance by increasing return drag towards the wind at a higher proportion than the effective useful drag added from the same blades when they are being acted upon by the wind to rotate the axle.

In embodiments of the present rotor and blades, the addition of the secondary blades with a different configuration relative to that of the primary blades reduces the negative (or detrimental) effects of adding more primary blades of the same configuration by utilizing the aerodynamic benefits provided through the addition of secondary blades of a different configuration that augment the performance of the rotor rather than detracting from it.

The utility and benefit of the primary and secondary wind turbine blades comprising a wind turbine rotor having a beneficial aerodynamic effect has so far been described using two-dimensional cross-sectional views of a center point of one possible configuration of primary and secondary blades. In another example, a three-dimensional view of a rotor configuration using the advantageous methods described is provided in FIG. 5.

Figure 5:
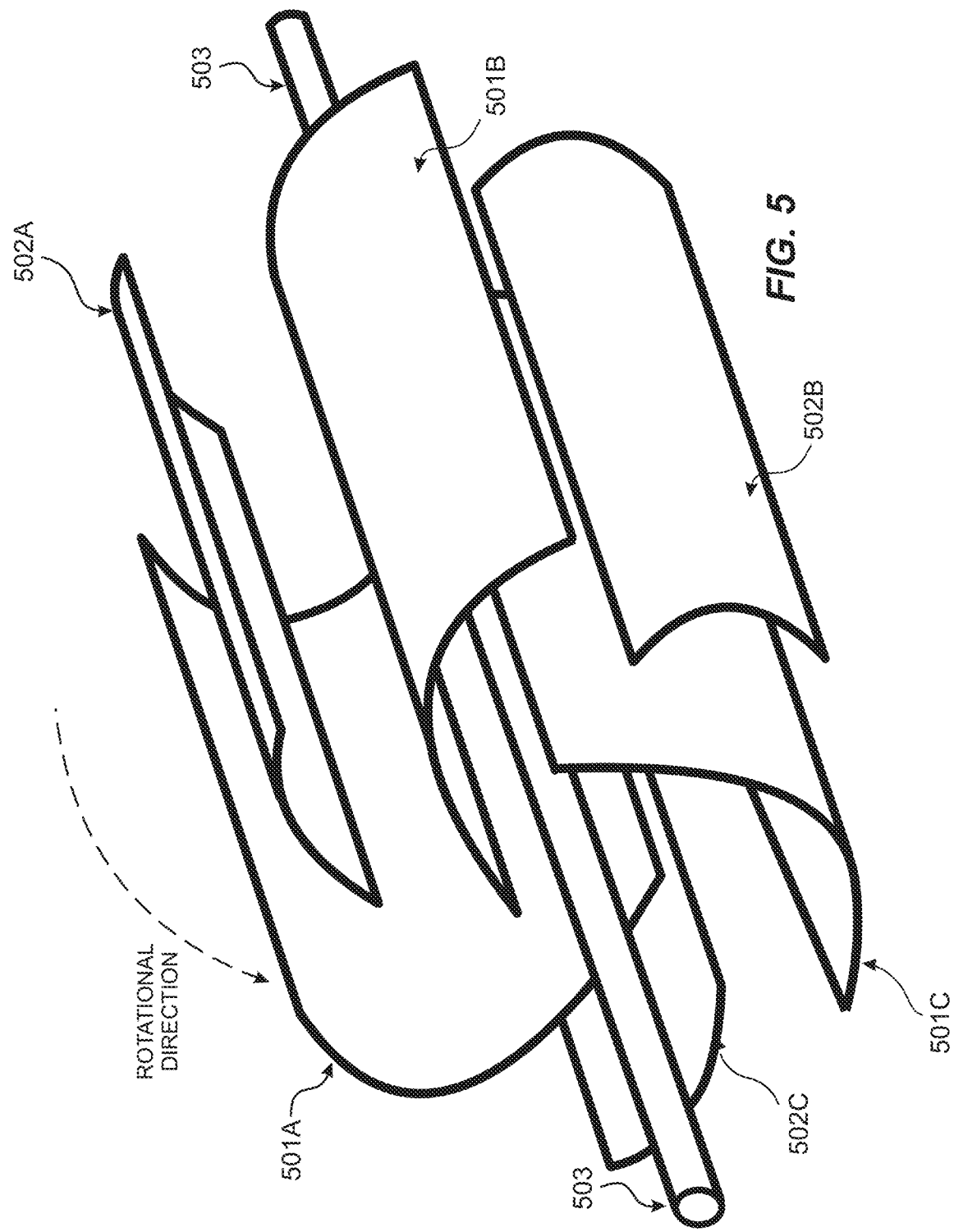
FIG. 5 is an isometric three-dimensional view of an example wind turbine rotor configuration illustrated relative to the axle.

FIG. 5 illustrates a three-dimensional view of an embodiment with three primary blades (501A, 501B, 501C) and three secondary blades (502A, 502B, 502C) illustrated positioned relative to axle or shaft 503.

The blades, including the primary blades (501A, 501B, 501C) and the secondary blades (502A, 502B, 502C), can be secured together or to the axle to rotate around the axle in fixed relative positions. For example, the blades can be secured to end caps that are secured to the axle. In another example, the blades can be secure to each other using structural bars, struts, trusses, or the like. In a further example, the blades can be secured to the axle using a hub and optional bars, struts, trusses, or the like.

While a specific dimensional relationship between the blades, rotor, and axle is illustrated in the drawing, the particular configuration is not limited to any specific size or configuration. More than one rotor may be attached to a longer axle or shaft, wherein each attached rotor contributes to the overall power output potential of the shaft.

The specific rotor configurations, as well as its individual possible blade configurations as illustrated in FIG. 2, FIG. 3, FIG. 4, and FIG. 5 are provided to illustrate specific benefits, wherein the relationship between alternating primary and secondary blades enables a more efficient use of available wind energy for transmission into torque from the rotor to the axle than similar designs in practice.

The enhanced performance can in part be derived from the utilization of both surfaces of each of the primary and secondary blades for both directly transmitting wind energy directly to the axle and redirecting wind energy that is not captured directly (or overflow/exhaust wind) into adjacent blades.

As has also been previously described and illustrated in FIG. 4, additional performance and efficiency benefits can be realized through configuration and positioning of the primary and secondary blades to encourage exhaust or bypass air through a wind turbine rotor, where the exhaust air from the rotor provides a further beneficial effect to overall torque transmitted from the rotor to the axle. The beneficial effect of the continuous cycle method described herein, which utilizes primary and secondary blades in an advantageous wind turbine rotor configuration, is not limited to the specific rotor and blade configurations illustrated in FIG. 1 through FIG. 5.

Many variations of the wind turbine rotor are envisaged. In the example embodiments illustrated, a rotor configuration using three primary blades and three secondary blades has been used. The example rotor configuration that has been illustrated is not intended to be considered as limiting to any specific number of blades, rotor size, or specific blade size or geometry in order to achieve the benefits of the enhanced performance. For example, a wind turbine rotor using two primary blades and two secondary blades may significantly increase the performance of a drag-based crossflow wind turbine using only two primary blades. Accordingly, a wind turbine rotor using two primary blades, and two or more secondary blades between the primary blades may provide further benefit. In another example, a wind turbine rotor using four primary blades and four secondary blades may also be used.

Multiple secondary blades may be used within a given set of primary blades. For example, a rotor with four primary blades may include two or more secondary blades spaced between the primary blades and achieve the benefits. Accordingly, for example, a rotor with three primary blades and nine secondary blades (wherein three secondary blades are positioned between each primary blade) may also be used.

In another example, a rotor with five, six, or seven or more primary blades with interacting secondary blades may also be utilized in a configuration that is advantageous.

Embodiments provide improved performance for transverse-axial or crossflow wind turbine applications, particularly drag-based wind turbines. Embodiments may be used beneficially in either horizontal or vertical axis applications. Embodiments include a wind turbine rotor that is highly configurable and well suited to multiple applications of use.

Figure 6:
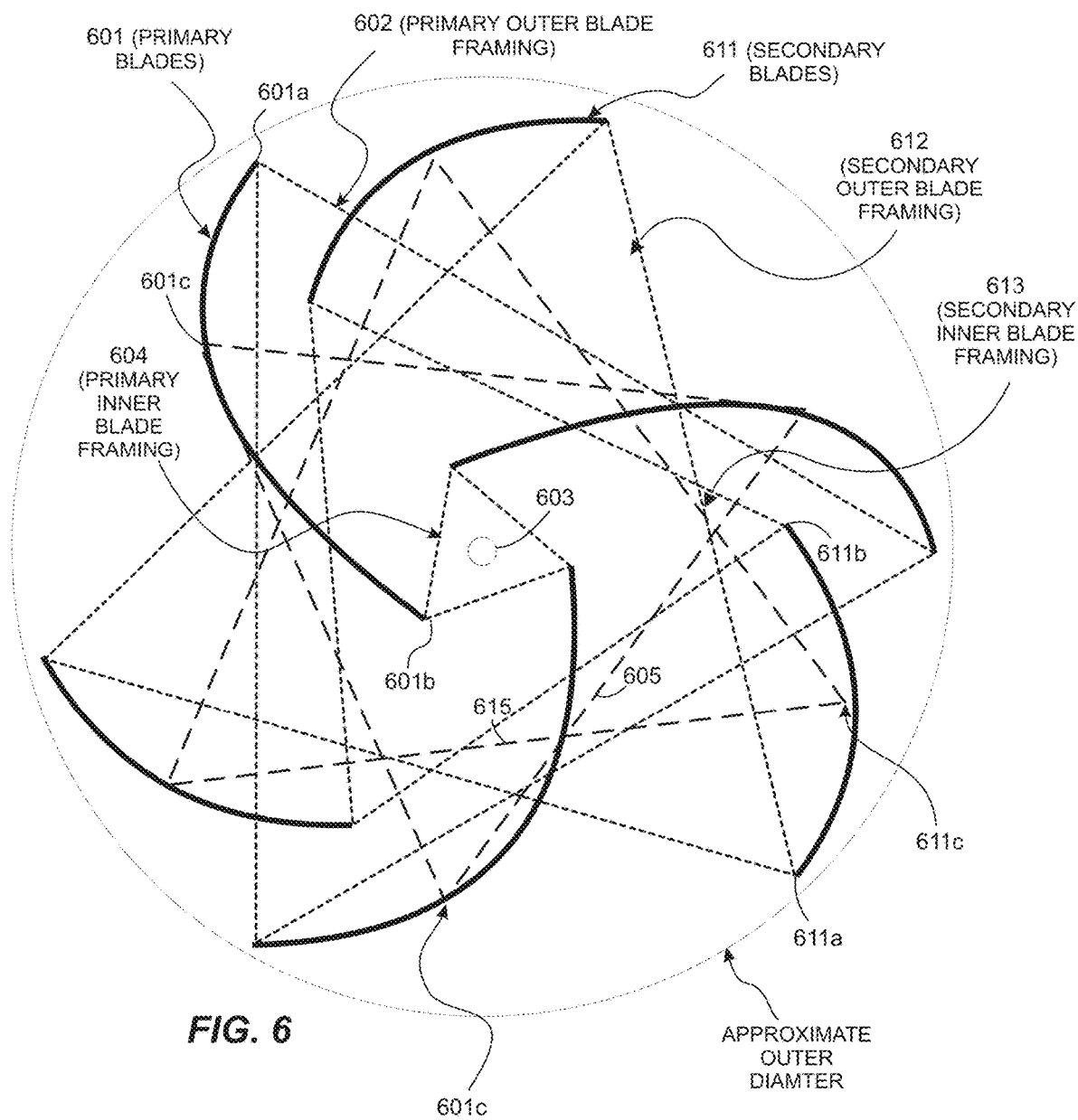
FIG. 6 is a cross sectional drawing of an example wind turbine rotor.

FIG. 6 is provided to illustrate the configurable nature of a described wind turbine rotor, using the example of a rotor with three primary blades and three secondary blades. The three primary blades are collectively indicated by reference character 601. Likewise, the three secondary blades are collectively indicated by reference character 611. Additional indicators illustrate the geometric points that define an example embodiment of the rotor design to illustrate methods of the configurable nature of rotor design. Because the example design provides three primary and three secondary blades, the geometric indicators are triangular. Designs including more than three primary or secondary blades would result in other polygonal geometric indicators.

The outer circumference points 601a of the primary blades 601 are found at the vertices of the dotted line triangle identifying primary outer blade framing 602. The inner circumference points 601b of the primary blades 601 are found at the vertices of the dotted line triangle identifying primary inner blade framing 604. Each of the primary blades 601 has an apex point 601c between the respective inner and outer circumferential points, 601a and 601b, thereof. The outer circumference points 611a of the secondary blades 611 are found at the vertices of the dotted line triangle identifying secondary outer blade framing 612. The inner circumference points 611b of the secondary blades 611 are found at the vertices of the dotted line triangle identifying secondary inner blade framing 613. Each of the secondary blades 611 has an apex point 611c between the inner and outer circumferential points, 611a and 611b, thereof.

Apex points can define both the shape and curvature of each set of primary and secondary blades, 601 and 611, respectively. The apex points 601c for the primary blades 601 are illustrated in this embodiment at the vertices of the hashed line triangle 605. The apex points 611c for the secondary blades 611 are illustrated in this embodiment at the vertices of the hashed line triangle 615.

By varying either the size or angle of the indicated circumference points 601a, 601b, 611a and 611b, and apex points 601c and 611c, the configuration of the rotor can be adjusted to enable different performance characteristics that provide benefits to suit the deployment type or specific wind conditions at the site of deployment. For example, if deployed in a transverse-axial flow horizontal axis configuration on a building rooftop facing a prevailing wind direction, the rotor configuration may be designed to utilize the airflow that is concentrated and accelerated over a building rooftop. In this type of deployment multiple rotors may be advantageously used along a common axle, and each may receive concentrated wind from an upward direction as natural result of wind flowing across the top of the structure.

In a vertical axis (or Vawt) configuration, multiple rotors may also be used along a common axle or shaft. The benefits are available in both vertical or horizontal deployments of the wind turbine rotor or rotors. As has been discussed, the curvature, size, length, width, depth, and relative angle of each blade or scoop may vary to achieve the desired effect.

For example, in one embodiment, the rotational diameter of a single rotor may be designated at one meter. Using FIG. 6 as an example and in particular to describe the set of primary blades 601 indicated, each of the inner circumference points 601b of each of the primary blades do not point directly to the axle 603. In an example, the inner circumference points 601b are positioned at a point in a range that is 5% to 50% from the center of the rotor along the radius of the rotor. For example, the inner circumference points 601b can be positioned at a point in a range that is 10% to 40% or 20% to 30% from the center of rotor along the radius of the rotor to the outer diameter. In an example, the inner circumference points 601b of primary blades 601 can be positioned at approximately 25% from the center axis of rotation along the radius. The inner circumference points 601b of each primary blade 601 are directed (when projected along a tangent to the primary blade at the inner circumference point) away from the axle 603 and towards another primary blade as illustrated in FIG. 6 by the inner circumference points 601b 603.

The length of each primary blade 601 as illustrated FIG. 6, wherein the length is defined by the distance along the primary blade 601 between the outer circumference points 601a and the inner circumference points 601b, is in a range of 40% to 80% of the rotor diameter. For example, the length is in a range that is 45% to 75% or 50% to 60% of the rotor diameter. The length of the primary blades can be approximately 55% of the overall diameter using the example provided.

The curvature depth of each primary blade, defined as the shortest distance from the apex point 601c to a straight line extending between the outer circumference points 601a and the inner circumference points 601b, is in a range of 10% to 60% of the length of the primary blade. For example, the curvature depth can be in a range that is 15% to 40% or 20% to 35% of the length of the primary blade. The curvature depth can be approximately 25% of the length of each primary blade.

Using this configuration of primary blades 601, a portion of the wind that travels across both the concave and convex surfaces of the primary blades 601, wherein the point of rotation of the outer edge of a primary blade 601 is facing substantially into the wind, which is redirected into the next primary blade.

The redirection of wind from one primary blade 601 to the next primary blade 601 (receiving primary blade) occurs at point into the receiving primary blade 601 which is in a range from 5% to 65% of the distance from the inner circumference point 601*b* of each primary blade relative to length of the blade. For example, the point can be in range of 15% to 45% or a range of 20% or 40% of the distance from the inner circumference point 601*b* of each primary blade relative to length of the blade. The redirection of the wind from one primary blade into another can be at a point which is located at approximately 33% or approximately one third of the distance from the inner circumference point 601*b* of the receiving blade.

In the example illustrated in FIG. 6, the apex points 601*c* of the primary blades 601 are placed in a position which is in a range of 20% to 80% of the length of the primary blade when measuring from the primary blade inner circumference points 601*b*. For example, the range is 45% to 75%, such as 50% to 70%, or approximately 66% of the length. Such apex points can form a complex radii curvature. In another example, the apex points 601*c* may be centered along the length the primary blades 601 and may form a blade profile or cross section that is either an arc or curve. For example, the arc or curve can be parabolic, circular, elliptical, hyperbolic, an involute curve, or a complex curve. The depth of the primary blades, as has been previously defined, may also be adjusted by moving the apex points 601*c* outward from length point of each primary blade 601 as defined by the distance between the outer circumference points 601*a* and the inner circumference points 601*b*.

As has been discussed herein, secondary blades 611 are added. The secondary blades 611 are placed in between the primary blades 601, and are configured to use a curvature, size, length, and angle that enhance the performance of the rotor.

In the example illustrated in FIG. 6, the secondary blades 611 have a length (measured from the inner circumference point 611*b* to the outer circumference point 611*a*) that is in the range of 10% to 55% of the overall rotor diameter. For example, the length can be in a range of 20% to 50%, or a range of 30% to 45% of the overall rotor diameter. In an example, the secondary blades can have a length of 40% or approximately two fifths of the overall rotor diameter. The apex points 611*c* of the secondary blades 611 can be disposed at a position in a range of 40% to 90% of the length of the blade from its inner circumference point 611*b*. For example, the apex points 611*c* can be disposed at a position in a range of 45% to 75% or 50% to 60% of the length of the blade from its inner circumference point 611*b*. The apex points 611*c* can be at 50% or approximately centered within the length of the blade. The length of the secondary blades can be 20% to 85% of the length of the primary blades. For example, the length of the secondary blade can be in a range of 40% to 80% or 50% to 75% of the length of the primary blades. In an example, the length of the secondary blades relative to the length of the primary blades can be 70%. The inner circumference points 611*b* of the secondary blades 611 can be disposed at a position in a range of 45% to 85% along the radius from the axle 603 to the outer diameter. For example, the inner circumference points can be disposed at a position 50% to 75% or 55% to 70% along the radius from the axle to the outer diameter. In an example, the inner circumference points of the secondary blades can be at a distance of 65% along the radius of the rotor from the center of rotation. The inner circumference points 611*b* of the secondary blades 611 are positioned substantially farther away from the axle 603 than the inner circumference points 601*b* of the primary blades 601.

In this example illustrated in FIG. 6, the air passing around both the convex and concave surfaces of the secondary blades 611 is also directed into the adjacent primary blades, wherein the secondary blades direct the bypass air into an adjacent primary blade 601 at a point that is in a range of 15% to 50% of the length of the adjacent primary blade when measured from the outer circumference point 601*a* of the adjacent primary blade 601. For example, the point can be in a range of 20% to 45% or 30% to 40% when measured from the outer circumference point 601*a* of the primary blade 601. The point can be at 33% or approximately at one third of the length of the primary blade 601 when measured from the outer circumference point 601*a* of the primary blade 601.

The space between the concave surfaces of the secondary blades 611 and the convex surfaces of the primary blades 601 decreases slightly from the point between the outer circumference points 611*a* of the secondary blades 611 and the outer circumference points 601*a* of the primary blades 601 relative to the inner circumference points 611*b* of the secondary blades 611 and the inner circumference points 601*b* of the primary blades 601. The air passing between primary blades 601 and secondary blades 611 is accelerated and directed into the concave surface of the adjacent primary blade 601.

The "Entry Point" is between the outer circumference point 611*a* of secondary blade 611 and near the apex point 601*c* of primary blade 601. The "Exit Point" is approximately between the inner circumference point 611*b* of secondary blade 611 and the inner circumference point 601*b* of primary blade 601. The cross-section at the Exit Point has an area of 65% to 95% of the area of the cross-section at the Entry Point. For example, the area at the Exit Point can be in a range can be 70% to 90% or 75% to 85% of the area at the Entry Point. In an example, the area at the Exit Point relative to the area at the Entry Point can be 80%.

Figure 7:
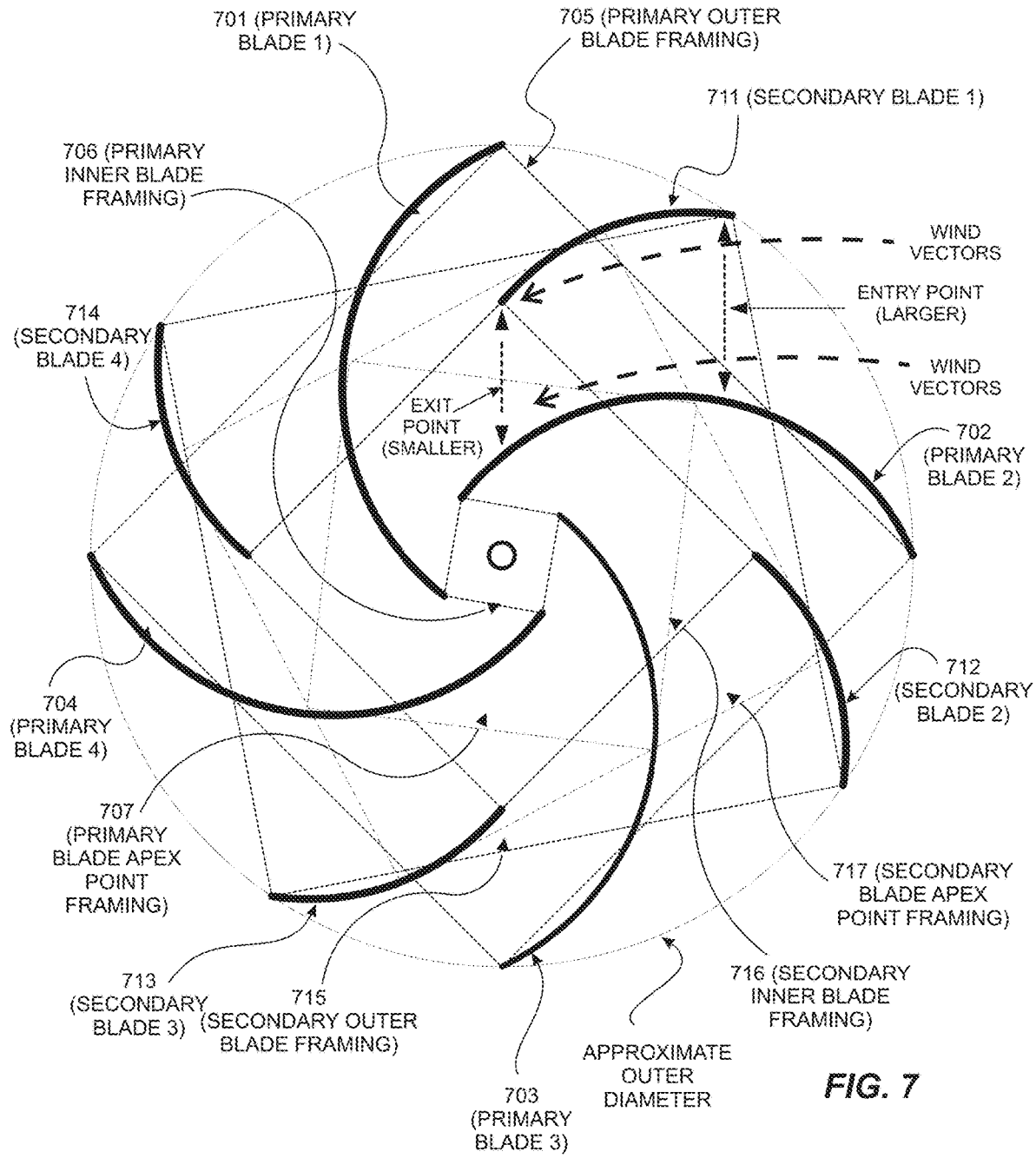
FIG. 7 is a cross sectional drawing of an example wind turbine rotor using four primary blades and four secondary blades.

The rotor configuration depicted in FIG. 7 uses four primary blades and four secondary blades, all of which have an arc shaped cross section profile. The embodiment of FIG. 7 provides the benefit of the continuous cycle effect, demonstrating the configurable nature of the wind turbine rotor. In FIG. 7, four primary blades (701, 702, 703, 704) and four secondary blades (711, 712, 713, 714) are illustrated positioned relative to a central axis of rotation.

The Primary Outer Blade Framing 705, Primary Inner Blade Framing 706, and Primary Blade Apex Point Framing 707 illustrate length, depth, and curvature of the primary blades. Similarly, the Secondary Outer Blade Framing 715, Secondary Inner Blade Framing 716, and Secondary Blade Apex Point Framing 717 illustrate the length, depth, and curvature of the secondary blades. The primary and secondary blades can have similar length, size, curvature, and position to those described in relation to FIG. 6.

The Wind Vectors are proximate to dashed lines pointing into the wind turbine rotor, wherein the wind is coming from the right side relative to the drawing orientation. In this view, the wind vector lines represent the general path or flow of the wind as it passes over the convex surface of primary blade 702, and under the concave surface of secondary blade 711.

The "Entry Point" is between the outer framing point of secondary blade 711 and near the apex point of primary blade 702. The "Exit Point" is approximately between the inner framing point of secondary blade 711 and the inner framing point of primary blade 702. In the example used in FIG. 7, the cross-section at the Exit Point has an area of 65% to 95% of the area of the cross-section at the Entry Point. For example, the area at the Exit Point can be in a range can be 70% to 90% or 75% to 85% of the area at the Entry Point. In an example, the area at the "Exit Point" relative to the area at the Entry Point can be 80%.

As is illustrated in the drawing, the wind passing over the convex surface of primary blade 702 and under the concave surface of secondary blade 711 is directed into the concave surface of primary blade 701. This configuration increases the amount of wind force directed into primary blade 701.

As described in relation to FIG. 1, in FIG. 7, the secondary blades 711, 712, 713, and 714 may be configured, via shape, angle, and position to cause an acceleration effect upon the wind passing into the indicated entry point between primary blade 702 and secondary blade 711, and the indicated exit point between primary blade 702 and secondary blade 711.

The entry point can be larger than the exit point by approximately ten percent. The length, or distance from the outer and inner framing points, of the secondary blades can be approximately fifty percent of the length of the primary blades.

The relative sizes and positioning of the primary and secondary blades may vary based on a number of factors. Such factors include the diameter of the rotor, number of primary and secondary blades, the type of deployment (horizontal or vertical), and whether or not external shielding or augmentation is utilized in the deployment.

While the term "framing" is used to define the inner and outer points of each primary and secondary blades with both FIG. 7 and FIG. 6, this is not intended to suggest a limitation to any specific construction methods for the blades surrounding the rotor. The triangular indicators illustrated in FIG. 6 as primary blade inner framing, primary blade outer framing, secondary blade inner framing and secondary blade outer framing are intended to illustrate the relational geometry of each blade in one possible embodiment wherein the wind turbine rotor comprises three primary blades and three secondary blades surrounding a central axis of rotation. The triangular indicators in FIG. 6 labeled as apex points for both the primary and secondary blades are provided to illustrate the deepest point of each blade.

Similarly, the labels provided in FIG. 7, specifically 705, 706, 707, 715, 716, and 717 are also intended to facilitate in the understanding of the geometry of this embodiment using a rotor configuration comprising four primary and four secondary blades. While it may be advantageous to use the inner and outer points on each of the primary and secondary blades for structural framing, other structural framing methods can be envisaged. A variety of methods exist for attaching or securing wind turbine blades to a central axle or hub.

Figure 8:
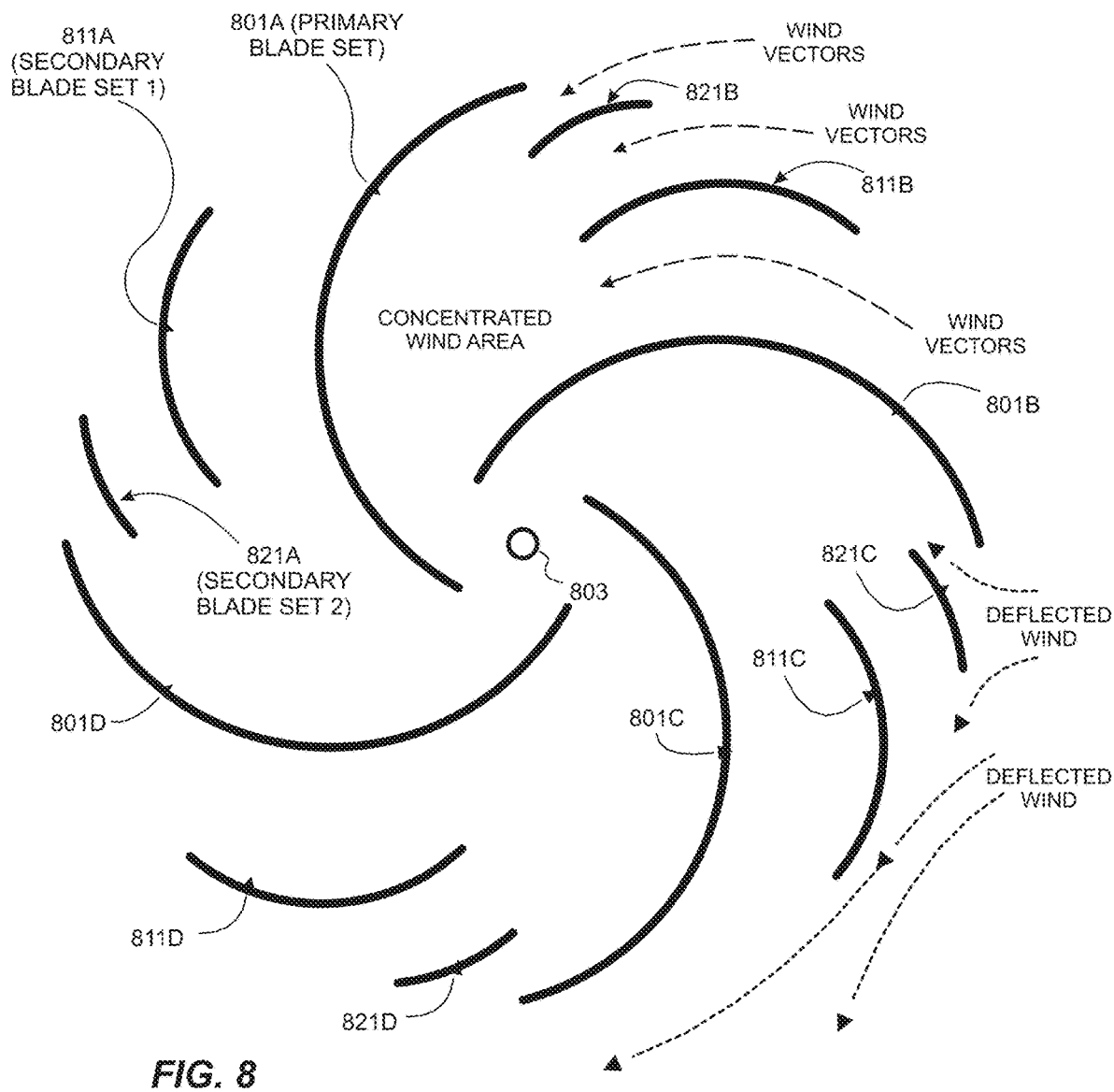
FIG. 8 is a cross sectional drawing of an example wind turbine rotor using four primary blades and eight secondary blades.

FIG. 8 illustrates another example of a rotor configuration in which a rotor using four primary blades and eight additional blades (e.g., 4 secondary and 4 tertiary blades). The four primary blades are indicated as 801A, 801B, 801C, and 801D. A set of secondary blades is indicated using the labels of 811A, 811B, 811C, and 811D. A set of tertiary blades is indicated using the labels of 821A, 821B, 821C, and 821D. For the purpose of clarity in the description of FIG. 8, the set of tertiary blades may be described as "booster blades". In this rotor configuration, each primary blade has a length as described above with respect to FIG. 6 or can be approximately 60% of the rotor diameter, and a blade depth at the center of the arc shaped blade can be as described above with respect to FIG. 6 or can be approximately 30% of the length of each primary blade. The secondary blades each have a length as described above with respect to FIG. 6 or can be approximately 30% of the rotor diameter, and a depth as described above with respect to FIG. 6 or can be approximately 20% percent of length of each secondary blade.

The tertiary blades can be smaller in size than the primary and can be smaller than the secondary blades. For example, the relative length (from inner circumference point to outer circumference point along the blade) of the tertiary blades compared to the overall rotor diameter can be in the range of 10% to 25%. In an example, the relative length can be in a range of lengths from 12% to 18%, or 14% to 16% of the rotor diameter. In an example, the relative length of the tertiary blades can be 15%. The positions of the inner circumference points of the tertiary blades are farther away from the center axis of the rotor than the primary and secondary blades. For example, the inner circumference points can be disposed at 70% to 90% along the radius from the axle or center point to the outer diameter, such as 80% to 95% along the radius. The depth of the tertiary blades may be in a range of 5% to 25% of the length of the blade. For example, the depth can be in a range of 8% to 22% or 10% to 20% of the length of the blade. In an example, the depth can be 15% of the length of the blade.

In FIG. 8, the wind direction coming towards the wind turbine rotor is substantially from the right, relative to the drawing orientation, causing counter-clockwise rotation about axle 803. There are three indicators labeled as Wind Vectors which are proximate to dashed lines pointing inwards into primary blade 801A. One wind vector line is illustrated passing between primary blade 801B and secondary blade 811B. A second wind vector line is illustrated passing between secondary blade 811B and booster blade 821B. A third wind vector line is illustrated passing over booster blade 821B and into primary blade 801A.

A "Concentrated Wind Area" is in a position within the concave area of primary blade 801A, wherein the dashed wind vector lines are pointing substantially towards that area of the rotor. In this embodiment, the wind turbine rotor may impart more torque to the axle or shaft as a result of the concentrated wind flow into the primary blades made possible from the secondary blades.

"Deflected Wind" wind flows into the portion of the wind turbine which is turning back into the wind during rotation. The illustrated direction of rotation is counterclockwise. In the illustrated position of rotation, booster blade 821C deflects a portion of the wind upward into the concave area of primary blade 801B, and a portion of the wind downward towards a partially exposed area of the convex surface of secondary blade 811C.

As is further illustrated, secondary blade 811C will also substantially deflect wind in a downward direction relative to the orientation of FIG. 8. The "downward direction" is intended to assist in the understanding of the drawing. The downward direction may also be described as an outward direction, wherein the deflection of the wind is directed away from the center of rotation.

Primary blade 801C is substantially blocked from incoming wind due to the wind deflection that occurs from booster blade 821C, and then further deflected by secondary blade 811C. As a result, primary blade 801C receives lower back pressure while turning back into the wind than if implemented on a rotor without the use of secondary blades or tertiary blades.

A further notable benefit is that primary blade 801C, while in the illustrated position of rotation, nearly completely blocks the following booster blade 821D and the secondary blade 811D from return drag. This demonstrates the previously described benefit, wherein additional blades that increase the capture of wind and enhance performance of the wind turbine rotor without adding additional return drag may be added to a drag-based crossflow wind turbine rotor.

The blade of the rotor can be coupled to each other or to the shaft or axle using various structures. For example, the blades can be coupled to end caps that are coupled to the shaft or axle. In another example, the blades can be attached to the shaft or axle using separate hubs and struts or bars.

Figure 9:
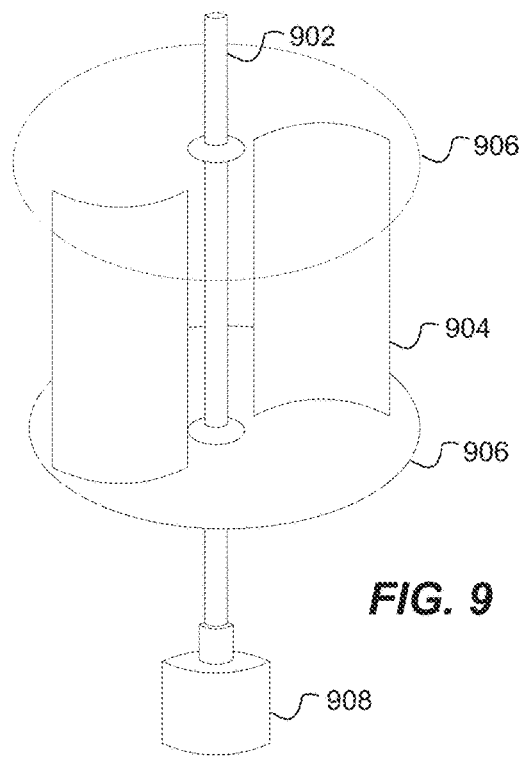
FIG. 9, FIG. 10, and FIG. 11 includes illustrations of example wind turbine systems.

For example, as illustrated in FIG. 9, the blades 904 of a rotor can be attached to end caps 906 that couple to the shaft 902. The blades 904 are held in positions that are fixed relative to other blades 904 by the end caps 906. While one rotor including a set of blades coupled to end caps is illustrated, more than one rotor can be coupled to the shaft 902. Optionally, the shaft 902 can be connected directly to a generator 908, such as an axial flux generator, or alternatively, can be indirectly connected to a generator through other mechanisms. For example, the shaft 902 can be coupled to the generator using a mechanical transmission method, such as chain and sprocket, gears, a belt and pulley system, friction drive, fluid drive, continuous variable transmission (CVT), or other methods of transmission.

Figure 10:
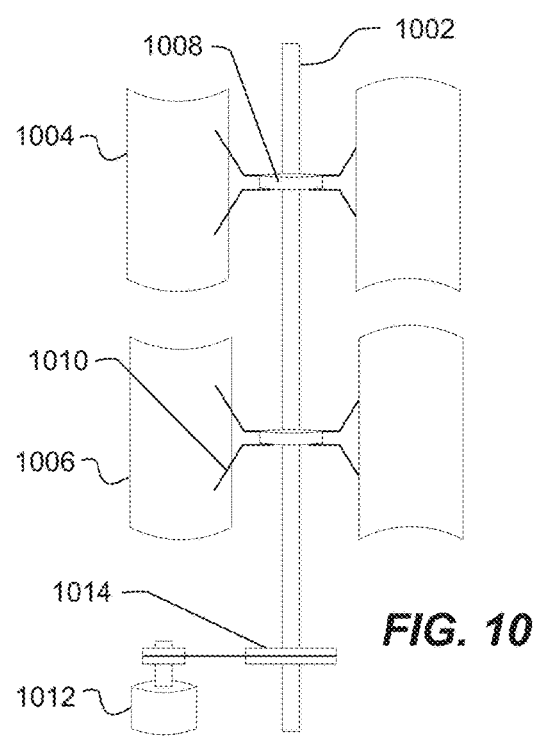

In another example illustrated in FIG. 10, blades 1004 or 1006 are attached to the shaft 1002 using hubs 1008. The blades 1004 or 1006 can be attached to the hubs directly or using brackets, struts, or trusses. For example, the blades 1004 of a rotor assembly can each be attached to the shaft 1002 and the blades 1006 of another rotor assembly can each be attached to the shaft 1002. In an example, the shaft 1002 can be coupled with a generator 1012 using a chain and sprocket 1014, a belt and pulley system, or another ratio drive mechanism.

Figure 11:
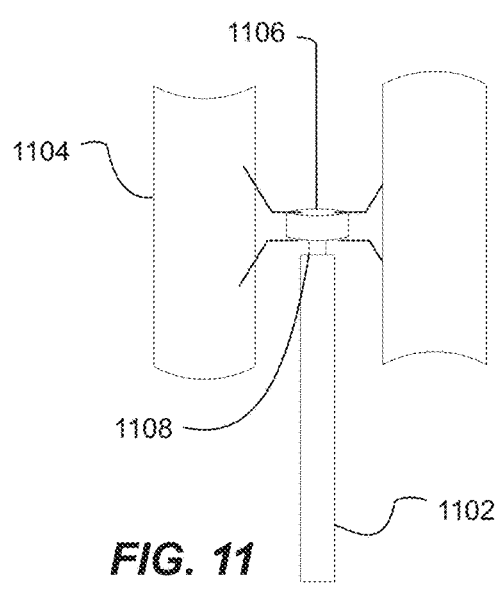

In a further example illustrated in FIG. 11, blades 1104 of a rotor assembly can be attached to a generator housing 1106. The generator housing 1106 rotates and has a shaft 1108 which remains stationary. The shaft 1108 is connected to the top of a tower 1102.

In a further example, one or more augmenters can be positioned around the rotor or rotors. The augmenters can function to gather wind from a greater area, concentrate wind, or partially block wind. In an example, the augmenters are in a fixed position relative to the rotor or rotors. While the blades of the rotor rotate around an axis, shaft, or axle, the augmenters can be fixed relative to the axis, shaft, or axle. For example, the number of augmenters can be in a range of 1 to 12, such as a range of 4 to 10 or a range of 6 to 10.

The augmenters can have a length, for example, measured from a point closest to the rotor and along the augmenter to a furthest point. In an example, the length of the augmenter can be in a range of 0.1 to 10 times the diameter of the rotor. For example, the length of the augmenter can be in a range of 0.5 to 5 times the diameter of the rotor, such as 0.5 to 2 times the diameter of the rotor.

Further, the augmenters can be positioned at an angle relative to a radial direction extending from the axis or axle. In an example, the angle can be in a range of 10° to 90°, such as a range of 15° to 70°, a range of 15° to 60°, or a range of 25° to 500.

In an additional example, the augmenters can have a shape, such as straight or curved. In an example, a curved shape can be parabolic, circular, elliptical, hyperbolic, an involute curve, or a complex curve. For example, the curve can be an involute curve or a complex curve. In another example, the curve can be a parabolic curve. In a further example, the shape can be straight.

Figure 12:
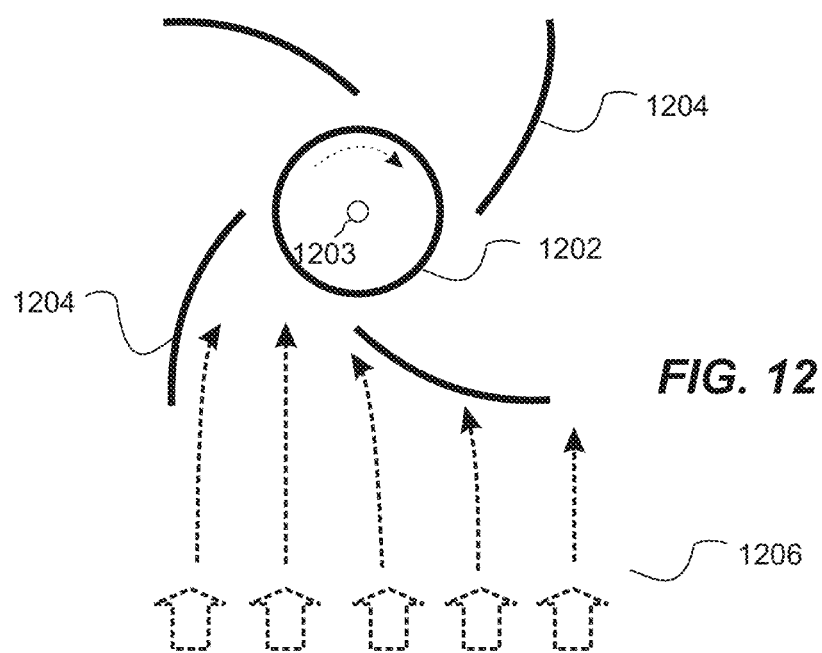
FIG. 12, FIG. 13, FIG. 14, FIG. 15, FIG. 16, FIG. 17, FIG. 18, FIG. 19, FIG. 20, and FIG. 21 include illustrations of example wind turbine systems including augmenters.
Figure 13:
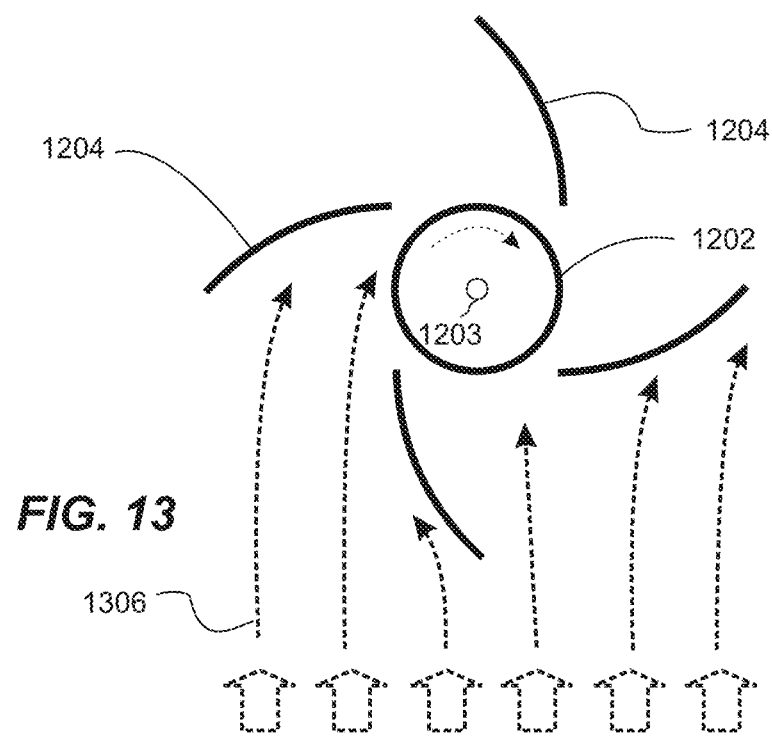

For example, FIG. 12 and FIG. 13 illustrate augmenters 1204 distributed around a rotor 1202. The augmenters 1204 have a length greater than the diameter of the rotor 1202, such as 1.2 to 2 times the diameter of the rotor 1202. The augmenters 1204 are disposed at an angle of 45° relative to a radial direction extending from the axle 1203. As illustrated, the augmenters 1204 are disposed at fixed positions distributed evenly around the rotor. For example, the four augmenters 1204 are distributed at 90° offsets around the rotor 1202. In FIG. 12, wind 1206 is illustrated as entering from a direction relative to the fixed augmenters 1204. Much of the wind is concentrated into the rotor. FIG. 13 illustrates wind 1306 entering from a different direction relative to the fixed position of the augmenters 1204. Some of the wind 1306 is concentrated by the augmenters 1204 and some is deflected by the augmenters 1204. A small portion of the wind 1306 may impinge on the rotor at a position in which the blades are returning. The above-described rotor designs are advantageously less sensitive to such impingement and more capable of deflecting such impingement than conventional designs.

Figure 14:
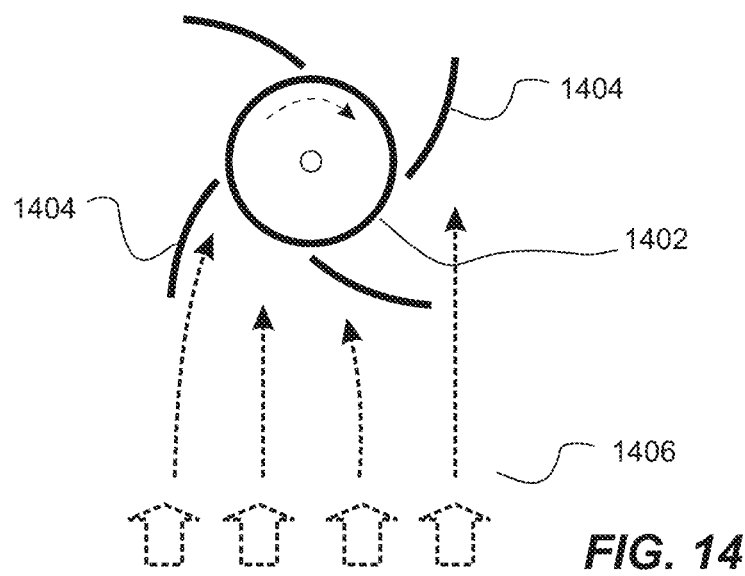
Figure 15:
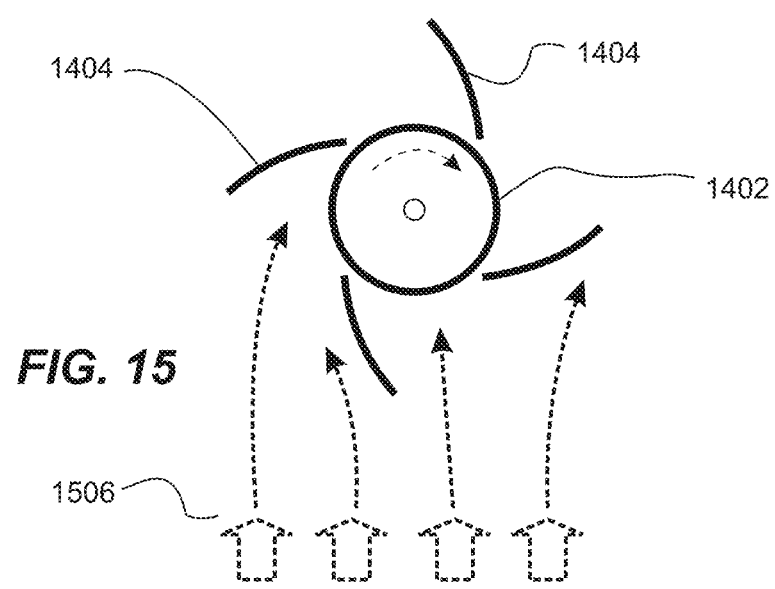

FIG. 14 and FIG. 15 illustrate augmenters 1404 distributed around a rotor 1402. The length of the augmenters 1404 is smaller than the diameter of the rotor 1402. For example, the length can be in a range of 0.5 to 0.95 times the diameter of the rotor 1402. The augmenters 1404 are disposed at an angle of 45° relative to a radial direction extending from the axle of the rotor 1402. As illustrated in FIG. 14, much of the wind 1406 is concentrated into the rotor 1402. When the wind 1506 enters from a different direction relative to the augmenters 1404, for example, as illustrated in FIG. 15, more of the wind 1506 can be deflected or concentrated by a different set of augmenters 1404. Here again, a small portion of the wind 1506 may impinge on the rotor at a position in which the blades are returning. The above-described rotor designs are advantageously less sensitive to such impingement and more capable of deflecting such impingement than conventional designs.

Figure 16:
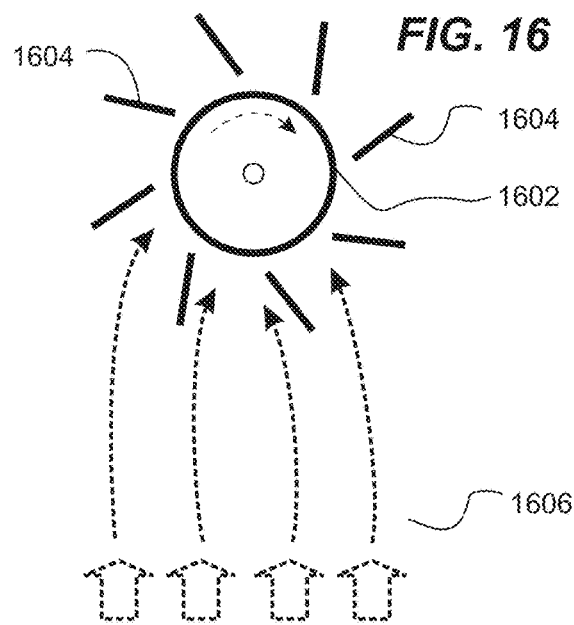
Figure 17:
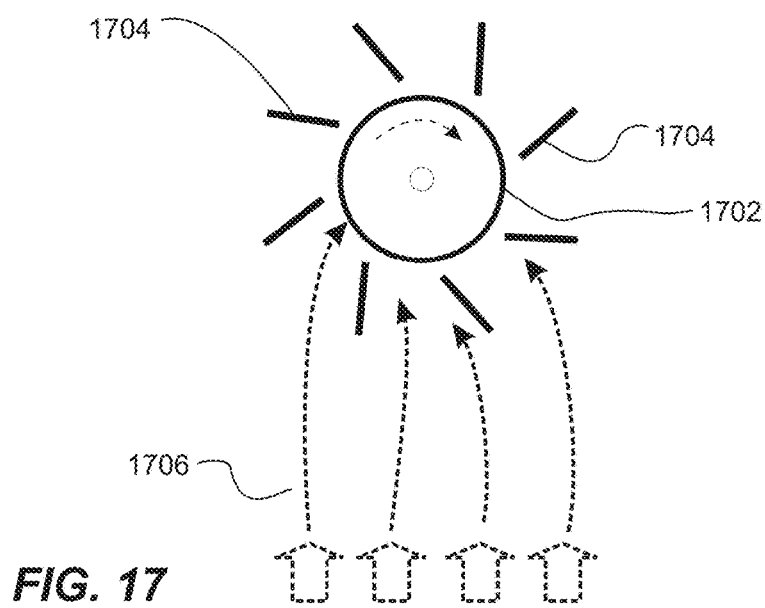

FIG. 16 and FIG. 17 illustrate the use of straight augmenters, for example, straight augmenters 1604 as depicted in FIG. 16, and straight augmenters 1704 as depicted in FIG. 17. In FIG. 16, wind 1606 is shown impinging upon straight augmenters 1604. In FIG. 17, wind 1706 is shown impinging upon straight augmenters 1704. As illustrated in FIG. 16, the augmenters 1604 having a length smaller than the diameter of the rotor 1602 are distributed evenly around the rotor 1602. For example, eight augmenters 1604 are distributed around the rotor 1604 and gather more wind 1606 than the rotor 1602 alone and concentrates some of the wind 1606 into the rotor 1602. In another example, FIG. 17 illustrates larger straight augmenters 1704 distributed around a rotor 1702. In an example, a length of the augmenters 1704 can be greater than a diameter of the rotor 1702.

Figure 18:
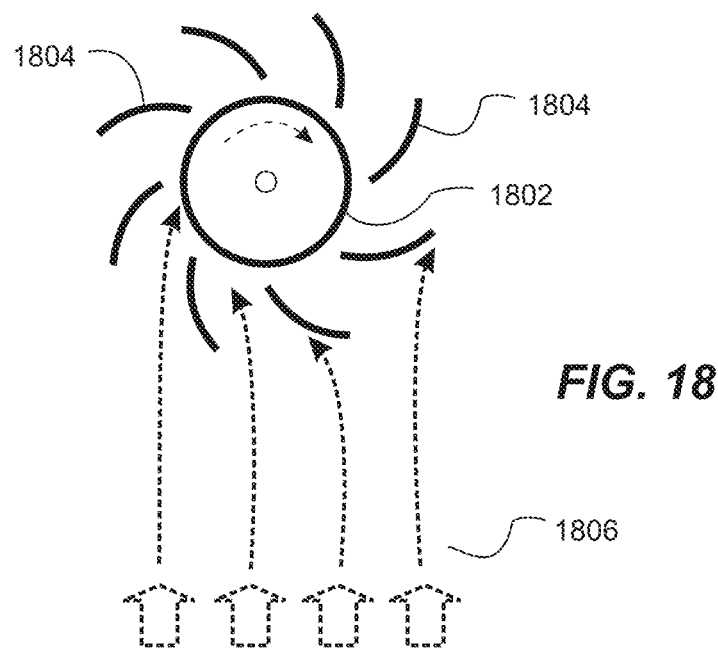
Figure 19:
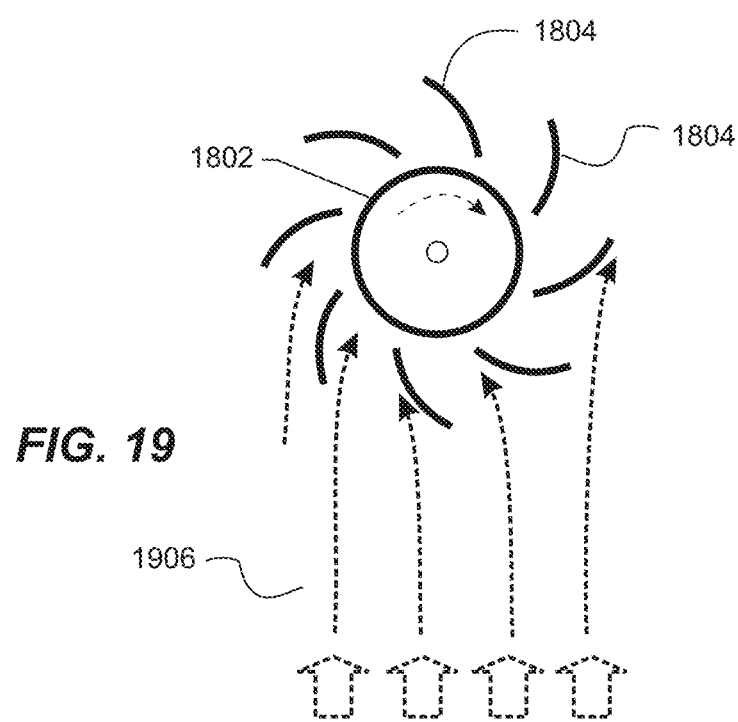

In further examples, FIG. 18 and FIG. 19 include eight curved augmenters 1804 distributed around a rotor 1802. Wind 1806 entering a direction as illustrated in FIG. 18 is concentrated or deflected. Similarly, wind 1906 entering from a different direction as illustrated in FIG. 19 are concentrated by different augmenters 1804 or deflected away from the rotor 1802.

Figure 20:
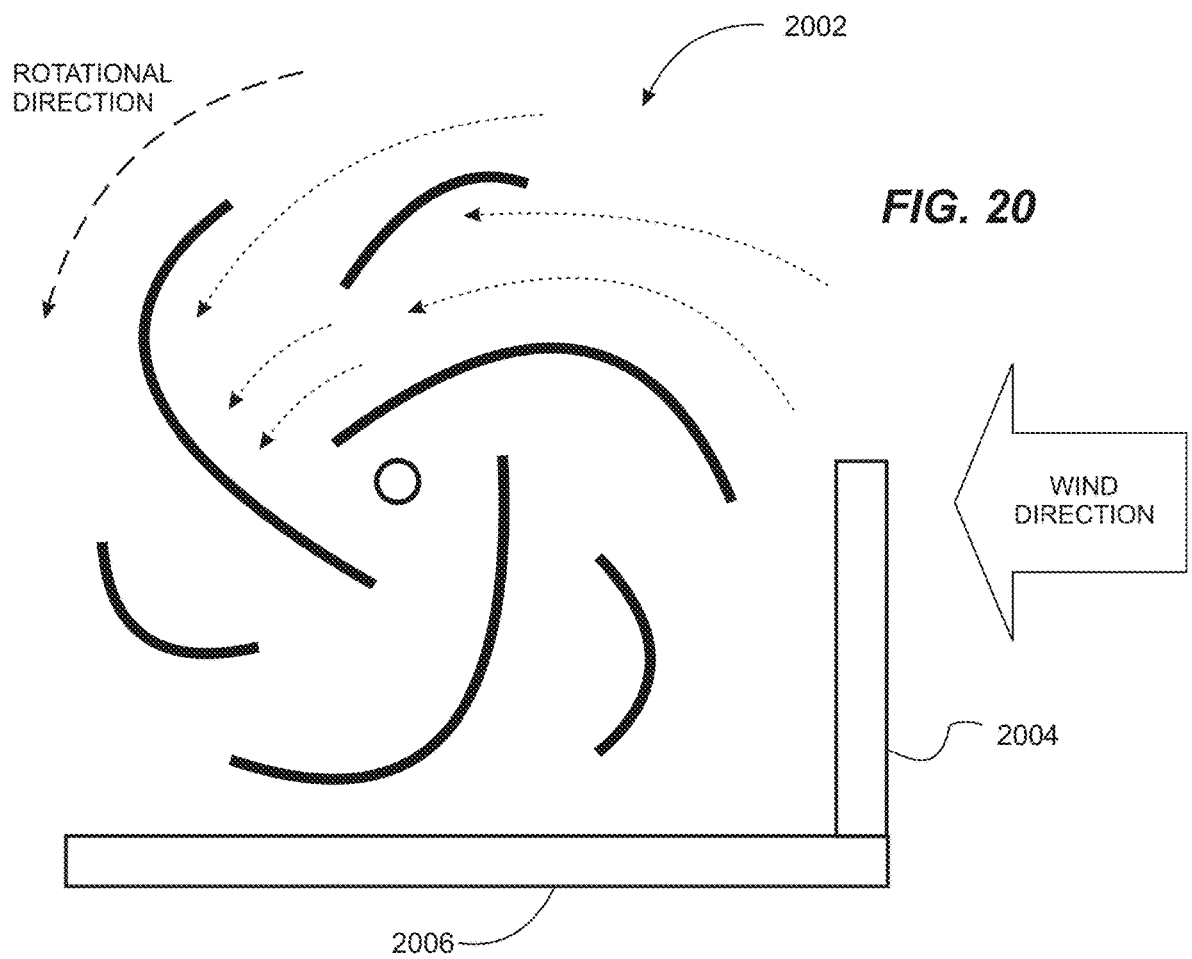

In a further example, a single augmenter or parapet wall of a building can be used to partially block wind. For example, as illustrated in FIG. 20, an augmenter or parapet wall 2004 can be disposed to partially block wind approaching a horizontal rotor 2002 positioned over a horizontal surface 2006. The wind can be blocked from impinging rotor blades that are moving back into position to receive wind.

Figure 21:
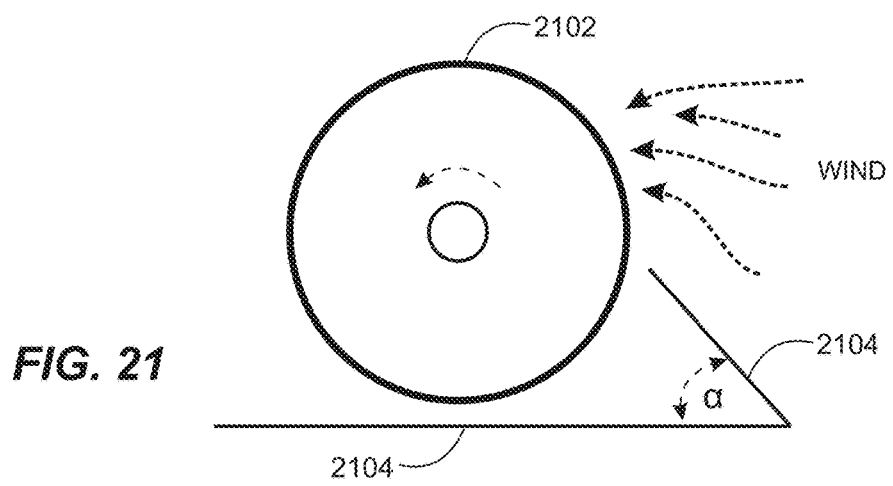

In another example, the single augmenter or parapet wall can be angled to direct wind into the rotor while blocking wind from impinging the returning side. For example, FIG. 21 illustrates an angled augmenter 2104 directing wind into a rotor 2102 that is disposed horizontally over a surface 2104, such as the roof of a building. The augmenter 2104 is disposed at an angle α relative to the surface, such as an angle in a range of 15° to 80°, a range of 25° to 70°, or a range of 35° to 60°.

Embodiments provide various improvements to a drag-based, crossflow wind turbine rotor design. A primary benefit is a performance increase through the use of varying configurations of primary and secondary blades within the rotor.

When using this wind turbine rotor design, many variations are possible. For example, when used in transverse axial (or cross-flow) horizontal axis configuration, and if external augmentation is added to either or both of the upper and lower areas surrounding the wind turbine rotor assembly to further concentrate the wind into the rotor, the rotor configuration may be adjusted to utilize the force and direction of the concentrated wind.

When used in a vertical axis wind turbine application, the rotor may be configured specifically for wind conditions at the point of deployment. In a free-standing vertical axis deployment, the advantages and benefits of the continuous cycle method described herein are realized from all wind angles.

Various configurations of the wind turbine rotor configuration may be suited for low, moderate, or high wind conditions with minor adjustments. For example, embodiments of the wind turbine rotor design presented are not limited to any specific size. In an embodiment, the parts for a completed rotor assembly may be designed at a size that allows transport of one or more rotors on a standard shipping pallet. In some cases, larger or smaller rotor assemblies may be desirable.

The rotor can be formed from various materials. For example, materials such as fiberglass, plastic, or aluminum, steel, alloys, textiles, or other materials, or any combination of such materials may be used for the construction of the rotor and its blades.

Various configurations or geometries of the rotor and its individual blades can be used. For example, the cross-sectional views illustrated in the accompanying drawings are embodiments of specific aerodynamic improvements using curvatures of blades along a single axis of each blade. The surfaces of each individual blade may have curvatures or geometry that varies across multiple axes. For example, if the surface of each blade is curved along both the X and Y axis, using a generally rectangular shape, the blade may resemble a form similar to that of a rectangular parabolic dish. If a blade surface is curved along a single axis, such as is illustrated in FIG. 5, sidewalls or end caps may be added to span the areas on either side of the blade from the outer diameter point to the inner diameter point, while also spanning the area completely up to the blade curvature. The geometry of the sidewalls may also be varied.

The wind turbine can be connected to various mechanical or electrical systems to transfer mechanical energy to other devices. For example, the wind turbine can be connected to generators for generating electricity from the mechanical energy collected from wind. In another example, the wind turbine can be connected to mechanical systems, such as pumps or momentum storage systems.

In a first embodiment, a wind turbine rotor includes an axle, a plurality of primary blades disposed at regular intervals around the axle, and a plurality of secondary blades disposed around the axle between primary blades of the plurality of primary blades. Each secondary blade of the plurality of secondary blades is smaller than each primary blade of the plurality of primary blades.

In an example of the first embodiment, a length of the each secondary blade is in a range of 20% to 50% of a diameter of the wind turbine rotor.

In another example of the first embodiment and the above examples, an apex point of the each secondary blade is 40% to 90% along the length of the each secondary blade from an inner circumference point of the each secondary blade.

In a further example of the first embodiment and the above examples, a length of the each secondary blade is 20% to 85% of the length of the each primary blade.

In an additional example of the first embodiment and the above examples, an inner circumference point of the each secondary blade is 45% to 85% along a radius extending from the axle to the outer diameter.

In another example of the first embodiment and the above examples, an inner circumference point of the each secondary blade is further from the axle than an inner circumference point of the each primary blade.

In a further example of the first embodiment and the above examples, an area at an exit point between the each secondary blade and the each primary blade is smaller than an area at an entry point between the each secondary blade and the each primary blade.

In an additional example of the first embodiment and the above examples, an area at an exit point between the each secondary blade and the each primary blade is between 65% and 90% of an area at an entry point between the each secondary blade and the each primary blade.

In another example of the first embodiment and the above examples, an inner circumference point of the each primary blade is 5% to 50% along a radius from the axle to the outer diameter.

In a further example of the first embodiment and the above examples, a length of the each primary blade is 40% to 90% of a diameter of the wind turbine rotor.

In an additional example of the first embodiment and the above examples, a curvature depth of the each primary blade is 10% to 60% of the length of the each primary blade.

In another example of the first embodiment and the above examples, the wind turbine rotor further includes a plurality of tertiary blades disposed between the plurality of primary blades and the plurality of secondary blades. For example, each tertiary blade of the plurality of tertiary blades is smaller than the each secondary blade of the plurality of secondary blades. In another example, each tertiary blade of the plurality of tertiary blades has a relative length of 10% to 25% of a diameter of the wind turbine rotor. In a further example, each tertiary blade of the plurality of tertiary blades has a curvature depth of 8% to 22% of a length of the each tertiary blade.

In a further example of the first embodiment and the above examples, the axle of the wind turbine rotor is disposed vertically.

In an additional example of the first embodiment and the above examples, the axle of the wind turbine rotor is disposed horizontally.

In a second embodiment, a wind turbine system for generating electricity includes an electric generator and a wind turbine rotor. The wind turbine includes an axle mechanically coupled to the generator, a plurality of primary blades disposed at regular intervals around the axle, and a plurality of secondary blades disposed around the axle between primary blades of the plurality of primary blades. Each secondary blade of the plurality of secondary blades is smaller than each primary blade of the plurality of primary blades.

In an example of the second embodiment, the axle is mechanically coupled directly.

In another example of the second embodiment and the above examples, the axle is mechanically coupled using a chain and sprocket, gears, a belt and pulley system, a friction drive, a fluid drive, or a continuous variable transmission (CVT).

In a further example of the second embodiment and the above examples, the wind turbine system further includes a plurality of augmenters disposed in fixed positions distributed around the wind turbine rotor. For example, an augmenter of the plurality of augmenters is straight. In another example, an augmenter of the plurality of augmenters is curved. In a further example, the curved augmenter has a shape including parabolic, circular, elliptical, hyperbolic, an involute curve, or a complex curve. In an additional example, an augmenter of the plurality of augmenters is disposed at an angle relative to a radial direction extending from the axle in a range of 10° to 90°. In another example, an augmenter of the plurality of augmenters has a length in a range of 0.1 to 10 times a diameter of the wind turbine rotor. For example, the length is 0.5 to 5 times the diameter of the wind turbine rotor.

In an example of the second embodiment, a length of the each secondary blade is in a range of 20% to 50% of a diameter of the wind turbine rotor.

In another example of the second embodiment and the above examples, an apex point of the each secondary blade is 40% to 90% along the length of the each secondary blade from an inner circumference point of the each secondary blade.

In a further example of the second embodiment and the above examples, a length of the each secondary blade is 20% to 85% of the length of the each primary blade.

In an additional example of the second embodiment and the above examples, an inner circumference point of the each secondary blade is 45% to 85% along a radius extending from the axle to the outer diameter.

In another example of the second embodiment and the above examples, an inner circumference point of the each secondary blade is further from the axle than an inner circumference point of the each primary blade.

In a further example of the second embodiment and the above examples, an area at an exit point between the each secondary blade and the each primary blade is smaller than an area at an entry point between the each secondary blade and the each primary blade.

In an additional example of the second embodiment and the above examples, an area at an exit point between the each secondary blade and the each primary blade is between 65% and 90% of an area at an entry point between the each secondary blade and the each primary blade.

In another example of the second embodiment and the above examples, an inner circumference point of the each primary blade is 5% to 50% along a radius from the axle to the outer diameter.

In a further example of the second embodiment and the above examples, a length of the each primary blade is 40% to 90% of a diameter of the wind turbine rotor.

In an additional example of the second embodiment and the above examples, a curvature depth of the each primary blade is 10% to 60% of the length of the each primary blade.

In another example of the second embodiment and the above examples, the wind turbine rotor further includes a plurality of tertiary blades disposed between the plurality of primary blades and the plurality of secondary blades. For example, each tertiary blade of the plurality of tertiary blades is smaller than the each secondary blade of the plurality of secondary blades. In another example, each tertiary blade of the plurality of tertiary blades has a relative length of 10% to 25% of a diameter of the wind turbine rotor. In a further example, each tertiary blade of the plurality of tertiary blades has a curvature depth of 8% to 22% of a length of the each tertiary blade.

In a further example of the second embodiment and the above examples, the axle of the wind turbine rotor is disposed vertically.

In an additional example of the second embodiment and the above examples, the axle of the wind turbine rotor is disposed horizontally.

In a third embodiment, a method for generating electricity includes installing a wind turbine system in the path of wind. The wind turbine system includes an electric generator and a wind turbine rotor, The wind turbine rotor includes an axle mechanically coupled to the generator, a plurality of primary blades disposed at regular intervals around the axle, and a plurality of secondary blades disposed around the axle between primary blades of the plurality of primary blades. Each secondary blade of the plurality of secondary blades is smaller than each primary blade of the plurality of primary blades.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A wind power turbine comprising:
   a plurality of primary blades disposed at regular intervals around an axle;
   a plurality of secondary blades disposed around the axle such that each secondary blade is interposed between a pair of successive adjacent primary blades of the plurality of primary blades, each secondary blade of the plurality of secondary blades sized smaller than each primary blade of the plurality of primary blades, each secondary blade of the plurality of secondary blades positioned and oriented to provide a wind shielding effect on an adjacent following primary blade of the plurality of primary blades; and
   a plurality of tertiary blades disposed around the axle, each tertiary blade interposed between a concave side of an immediately preceding adjacent primary blade of the plurality of primary blades and a convex side of an immediately following adjacent secondary blade of the plurality of secondary blades, each tertiary blade of the plurality of tertiary blades sized smaller than each secondary blade of the plurality of secondary blades, wherein the primary blades and the secondary blades alternate contributions to torque transmitted to the axle through redirection of a cross-flow wind simultaneously exerting a positive wind pressure to convex surfaces of individual blades of said primary and secondary pluralities of blades returning back into the wind during rotation, and to concave surfaces of individual blades of said primary and secondary pluralities of blades heading away from the wind during rotation.

2. The wind power turbine of claim 1, wherein each tertiary blade of the plurality of tertiary blades has a relative length of 10% to 25% of a diameter of the wind power turbine.

3. The wind power turbine of claim 1, wherein the plurality of primary blades further comprises three primary blades, and the plurality of secondary blades further comprises three secondary blades.

4. The wind power turbine of claim 1 wherein the plurality of primary blades further comprises at least four primary blades.

5. The wind power turbine system of claim 1, further comprising at least one augmenter disposed about the axle, wherein the position of the at least one augmenter remains fixed such that rotation of the axle and/or a turbine rotor disposed about the axle, does not affect the fixed position of the at least one augmenter.

6. The wind power turbine system of claim 5, wherein the at least one augmenter further comprises a plurality of augmenters distributed about the axle.

7. The wind power turbine system of claim 6, wherein the plurality of augmenters further comprises at least one of: straight augmenters and curved augmenters.

8. A wind power turbine system for generating electricity, the wind power turbine system comprising:
   an electric generator; and
   a wind power turbine comprising:
      an axle mechanically coupled to the electric generator;
      a plurality of primary blades coupled to, and disposed at regular intervals about, the axle;
      a plurality of secondary blades coupled to and disposed around about the axle, each secondary blade interposed between a pair of successive adjacent primary blades of the plurality of primary blades, each secondary blade of the plurality of secondary blades sized smaller than each primary blade of the plurality of primary blades, each secondary blade of the plurality of secondary blades positioned and oriented to provide a wind shielding effect on an adjacent following primary blade of the plurality of primary blades opposite a direction of a rotation of the axle; and
      a plurality of tertiary blades coupled to and disposed about the axle, each tertiary blade interposed between a preceding adjacent primary blade of the plurality of primary blades and a following adjacent secondary blade of the plurality of secondary blades, each tertiary blade of the plurality of tertiary blades sized smaller than each secondary blade of the plurality of secondary blades, wherein the primary blades and the secondary blades alternate contributions to torque transmitted to the axle through redirection of a cross wind flowing around at least some of the blades of the pluralities of primary, secondary and tertiary blades.

9. The wind power turbine system of claim 8, wherein each tertiary blade of the plurality of tertiary blades has a relative length of 10% to 25% of a diameter of the wind power turbine.

10. The wind power turbine system of claim 8, wherein the axle is mechanically coupled directly to the electric generator.

11. The wind power turbine system of claim 8, wherein the axle is mechanically coupled indirectly to the electric generator.

12. The wind power turbine system of claim 11, wherein the axle is mechanically coupled indirectly to the electric generator via at least one of: a chain and sprocket; gears; a belt and pulley system; a friction drive; a fluid drive; and a continuous variable transmission (CVT).

* * * * *